(12) United States Patent
Kussmaul et al.

(10) Patent No.: US 11,586,764 B2
(45) Date of Patent: Feb. 21, 2023

(54) PRIVACY NEGOTIATIONS IN A MIXED REALITY ENVIRONMENT

(71) Applicant: International Business Machines Corporation, Armonk, NY (US)

(72) Inventors: Timo Kussmaul, Boeblingen (DE); Uwe Karl Hansmann, Tuebingen (DE); Vijay Ekambaram, Chennai (IN); Padmanabha Venkatagiri Seshadri, Mysore (IN)

(73) Assignee: International Business Machines Corporation, Armonk, NY (US)

( * ) Notice: Subject to any disclaimer, the term of this patent is extended or adjusted under 35 U.S.C. 154(b) by 161 days.

(21) Appl. No.: 17/037,345

(22) Filed: Sep. 29, 2020

(65) Prior Publication Data

US 2022/0100893 A1   Mar. 31, 2022

(51) Int. Cl.
*G06F 21/62* (2013.01)
*G06F 21/57* (2013.01)

(52) U.S. Cl.
CPC ........ *G06F 21/6245* (2013.01); *G06F 21/577* (2013.01); *G06F 2221/033* (2013.01); *G06F 2221/2141* (2013.01)

(58) Field of Classification Search
None
See application file for complete search history.

(56) References Cited

U.S. PATENT DOCUMENTS

| | | | |
|---|---|---|---|
| 7,949,565 B1 | 5/2011 | Eldering et al. | |
| 9,536,350 B2 | 1/2017 | Novak et al. | |
| 10,007,928 B2 | 6/2018 | Graham et al. | |
| 2013/0169682 A1 | 7/2013 | Novak et al. | |
| 2013/0174213 A1 | 7/2013 | Liu et al. | |

(Continued)

FOREIGN PATENT DOCUMENTS

| | | | | |
|---|---|---|---|---|
| CN | 106933357 A | | 7/2017 | |
| EP | 3447671 A1 | * | 2/2019 | ............. G06F 21/56 |

(Continued)

OTHER PUBLICATIONS

Yassine, A. (2015). AAPPeC: Agent-based Architecture for Privacy Payoff in eCommerce. ArXiv, abs/1501.04850 (Year: 2015).*

(Continued)

*Primary Examiner* — Kristine L Kincaid
*Assistant Examiner* — Felicia Farrow
(74) *Attorney, Agent, or Firm* — Mark Bergner

(57) ABSTRACT

An application (App)-BOT, scans a context of a user of an application and obtains current scanned user data. The App BOT determines a set of user information entities from the scanned user data containing current information about the user. In a negotiation phase, the App BOT a data access request offer from a mixed reality data (MRD)-BOT. A privacy leak score is estimated that represents a user value attributed to the permission to access the labelled user information entity based on the data access request offer. Responsive to determining that the privacy leak score exceeds a privacy leak score threshold, an acceptance of the data access request offer is sent to the MRD BOT and providing access requested by the data access request. Otherwise, a counteroffer is sent to the offer to the MRD BOT.

20 Claims, 7 Drawing Sheets

(56) References Cited

U.S. PATENT DOCUMENTS

| | | | | |
|---|---|---|---|---|
| 2013/0298247 | A1* | 11/2013 | Laurila | G06F 21/6245 726/26 |
| 2014/0204117 | A1 | 7/2014 | Kinnebrew et al. | |
| 2018/0349946 | A1 | 12/2018 | Nguyen et al. | |
| 2020/0106750 | A1* | 4/2020 | Baker | G06F 21/6263 |

FOREIGN PATENT DOCUMENTS

| | | | |
|---|---|---|---|
| IN | 201721017374 A | * | 11/2018 |
| KR | 102039402 B1 | | 11/2019 |

OTHER PUBLICATIONS

Werre, Jason, "Mixed Reality and the Future of Ads", TechTelligence, 2 pages, downloaded from the following website on Aug. 25, 2020: https://www.advertisingweek360.com/mixed-reality-and-the-future-of-ads/.

Panda, P., "How mixed Reality will Transform Advertising", 18 pages, Feb. 1, 2017, downloaded from website: https://datafloq.com/read/how-mixed-reality-will-transform-advertising/2640.

Forbes Agency Council, "11 Creative Uses Of Augmented Reality In Marketing And Advertising", Jun. 13, 2017, Forbes Agency Council, 3 pages, downloaded from the following website: https://www.forbes.com/sites/forbesagencycouncil/2017/06/13/11-creative-uses-of-augmented-reality-in-marketing-and-advertising/#5e3989e86b12.

Curtin, Keith, "Mixed reality will soon mean big business for brands", 11 pages, Feb. 6, 2017, downloaded from the following website: https://venturebeat.com/2017/02/06/mixed-reality-will-soon-mean-big-business-for-brands/.

Samit, J., "Augmented Reality: Marketing's Trillion-Dollar Opportunity", Jul. 18, 2017, AdAge. Deloitte Digital, 5 pages, downloaded from the following website: https://adage.com/article/deloitte-digital/augmented-reality-marketing-s-trillion-dollar-opportunity/309678.

Davis, Dwight, "Cybersecurity Insights, Real-world risks in an augmented reality", 2 pages, Jul. 27, 2016.

Meng, W. et al., "The Price of Free: Privacy Leakage in Personalized Mobile In-App Ads", Georgia Institute of Technology, 15 pages, Published Date: Feb. 24, 2016-.

Authors et al.: Disclosed Anonymously, "Personalized Bot Generation Service to Negotiate Personal Deals with SME" 4 pages, IP.com No. IPCOM000258539D, Published Date: May 22, 2019.

Roesner, F. et al., "Security and Privacy for Augmented Reality Systems", 10 pages, (Submitted Nov. 2012, Revised Feb. 2013, Accepted Apr. 2013.).

Gleb, B., "How Augmented Reality Makes Advertising Interactive", 19 pages, Jan. 5, 2020, downloaded from the following website: https://rubygarage.org/blog/augmented-reality-in-advertising.

"Collections: VR in Advertising", Ads of the World, 3 pages, downloaded from the following website on Aug. 25, 2020: https://www.adsoftheworld.com/collection/vr_in_advertising.

"15 Cool Augmented Reality Advertising Campaigns", catchoom, 19 pages, Jan. 24, 2017, downloaded from the following website: https://catchoom.com/blog/15-cool-augmented-reality-advertising-campaigns/.

Lewis, M. et al., "Deal or No Deal? End-to-End Learning for Negotiation Dialogues", 11 pages, Jun. 16, 2017.

McGinn, J., "How much is too much personalization?", CU Lytics, 4 pages, Oct. 19, 2017.

Mell, P. et al., "The NIST Definition of Cloud Computing", Recommendations of the National Institute of Standards and Technology, NIST Special Publication 800-145, 7 pages, Sep. 2011.

"Mixed reality", From Wikipedia, the free encyclopedia, 11 pages.

* cited by examiner

PRIVACY NEGOTIATIONS IN A MIXED REALITY ENVIRONMENT

BACKGROUND

Disclosed herein is a system and related method for performing privacy negotiations in a mixed reality environment.

Mixed reality (MR), sometimes referred to as hybrid reality or augmented reality, is the merging of real and virtual worlds to produce new environments and visualizations where physical and digital objects co-exist and interact in real time. Mixed reality takes place not only in the physical world or the virtual world, but is a mix of reality and virtual reality, encompassing both augmented reality and augmented virtuality. When mixed reality is provided to users, the provider of MR data (MRD) may want to acquire as much information as possible from the users.

SUMMARY

According to one aspect disclosed herein, a computer-implemented method is provided for controlling exchange of data between applications, the method comprising, on a processor of an application (App)-BOT, scanning a context of a user of the application and obtaining current scanned user data entities. The method further comprises determining a set of user information entities from the scanned user data entities containing current information about the user and surroundings of the user, and labelling each user information entity of the set of user information entities with a user data permission to access the user information entity. In a negotiation phase, the method comprises negotiating by receiving a data access request offer from a mixed reality data (MRD)-BOT. The data access request offer comprising a request offer for a set of application specific permissions that are requested permissions to access a labelled user information entity. The method continues with estimating a privacy leak score that represents a user value attributed to the permission to access the labelled user information entity based on the data access request offer. Responsive to determining that the privacy leak score is equal to or exceeds a privacy leak score threshold, the method further comprises sending an acceptance of the data access request offer to the MRD BOT and providing access requested by the data access request. Responsive to determining that the privacy leak score is less than the privacy leak score threshold, sending a counteroffer to the offer to the MRD BOT.

According to another aspect disclosed herein, a method is provided for controlling exchange of data between applications, the method comprising, on a processor of a mixed reality data (MRD) BOT, negotiating, in a negotiation phase, by sending a data request offer to an application (App) BOT. The data request offer comprises a request for permission to access a labelled user information entity, receiving a counteroffer in response to the data request offer, filtering potential MRD based on data of the counteroffer, and determining a personalization score that takes into account incentive values. Responsive to determining that the personalization score meets or exceeds a personalization score threshold, the method comprises sending an acceptance of the counteroffer to the App BOT. Responsive to determining that the personalization score is less than the personalization score threshold, the method comprises sending a second counteroffer to the App According to another aspect disclosed herein, a system is provided for controlling exchange of data between applications, the system comprising an application (App) BOT comprising a memory and a processor, the processor being configured for scanning a context of a user of the application and obtaining current scanned user data entities. The processor is further configured for determining a set of user information entities from the scanned user data entities containing current information about the user and surroundings of the user, labelling each user information entity of the set of user information entities with a user data permission to access the user information entity. The processor is also configured for negotiating, in a negotiation phase, by receiving a data access request offer from a mixed reality data (MRD)-BOT, the data access request offer comprising a request offer for a set of application specific permissions that are requested permissions to access a labelled user information entity, estimating a privacy leak score that represents a user value attributed to the permission to access the labelled user information entity based on the data access request offer. Responsive to determining that the privacy leak score is equal to or exceeds a privacy leak score threshold, the processor is configured for sending an acceptance of the data access request offer to the MRD BOT and providing access requested by the data access request. Responsive to determining that the privacy leak score is less than the privacy leak score threshold, sending a counteroffer to the offer to the MRD BOT.

The system may also comprise a mixed reality data (MRD) BOT comprising a memory and a processor, the processor being configured for negotiating, in a negotiation phase, by sending a data request offer to an application (App-) BOT, the data request offer comprising a request for permission to access a labelled user information entity. The processor is also configured for receiving a counteroffer in response to the data request offer, filtering potential MRD based on data of the counteroffer, and determining a personalization score that takes into account incentive values. Responsive to determining that the personalization score meets or exceeds a personalization score threshold, the processor is configured for sending an acceptance of the counteroffer to the App BOT. Responsive to determining that the personalization score is less than the personalization score threshold, the processor is configured for sending a second counteroffer to the App BOT.

The computer program product contains instructions that are, accessible from a computer-usable or computer-readable medium providing program code for use, by, or in connection, with a computer or any instruction execution system. For the purpose of this description, a computer-usable or computer-readable medium may be any apparatus that may contain a mechanism for storing, communicating, propagating or transporting the program for use, by, or in connection, with the instruction execution system, apparatus, or device.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

Overview of the System

Figure 1A:
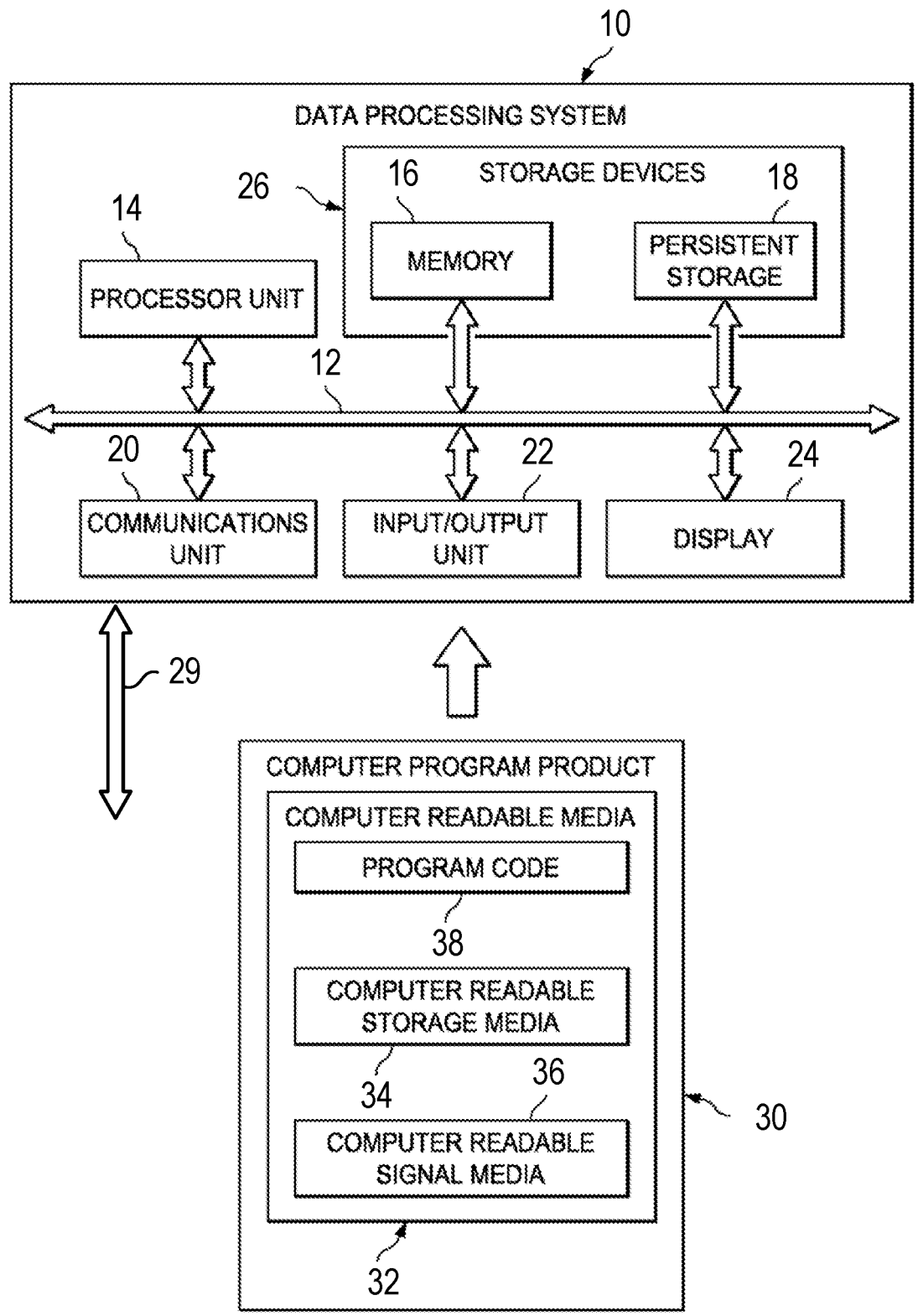
FIG. 1A is a block diagram of a data processing system (DPS) according to one or more embodiments disclosed herein.

The following acronyms may be used below:
API application program interface
ARM advanced RISC machine
CD-ROM compact disc ROM
CMS content management system
CoD capacity on demand
CPU central processing unit
CUoD capacity upgrade on demand
DPS data processing system
DVD digital versatile disk
EPROM erasable programmable read-only memory
FPGA field-programmable gate arrays
HA high availability
IaaS infrastructure as a service
I/O input/output
IPL initial program load
ISP Internet service provider
ISA instruction-set-architecture
LAN local-area network
LPAR logical partition
MR mixed reality
MRD mixed reality data
PaaS platform as a service
PDA personal digital assistant
PLA programmable logic arrays
RAM random access memory
RISC reduced instruction set computer
ROM read-only memory
SaaS software as a service
SLA service level agreement
SRAM static random-access memory
WAN wide-area network
Data Processing System in General FIG. 1A is a block diagram of an example DPS according to one or more embodiments. In this illustrative example, the DPS 10 may include communications bus 12, which may provide communications between a processor unit 14, a memory 16, persistent storage 18, a communications unit 20, an I/O unit 22, and a display 24.

The processor unit 14 serves to execute instructions for software that may be loaded into the memory 16. The processor unit 14 may be a number of processors, a multi-core processor, or some other type of processor, depending on the particular implementation. A number, as used herein with reference to an item, means one or more items. Further, the processor unit 14 may be implemented using a number of heterogeneous processor systems in which a main processor is present with secondary processors on a single chip. As another illustrative example, the processor unit 14 may be a symmetric multi-processor system containing multiple processors of the same type.

The memory 16 and persistent storage 18 are examples of storage devices 26. A storage device may be any piece of hardware that is capable of storing information, such as, for example without limitation, data, program code in functional form, and/or other suitable information either on a temporary basis and/or a permanent basis. The memory 16, in these examples, may be, for example, a random access memory or any other suitable volatile or non-volatile storage device. The persistent storage 18 may take various forms depending on the particular implementation.

For example, the persistent storage 18 may contain one or more components or devices. For example, the persistent storage 18 may be a hard drive, a flash memory, a rewritable optical disk, a rewritable magnetic tape, or some combination of the above. The media used by the persistent storage 18 also may be removable. For example, a removable hard drive may be used for the persistent storage 18.

The communications unit 20 in these examples may provide for communications with other DPSs or devices. In these examples, the communications unit 20 is a network interface card. The communications unit 20 may provide communications through the use of either or both physical and wireless communications links.

The input/output unit 22 may allow for input and output of data with other devices that may be connected to the DPS 10. For example, the input/output unit 22 may provide a connection for user input through a keyboard, a mouse, and/or some other suitable input device. Further, the input/output unit 22 may send output to a printer. The display 24 may provide a mechanism to display information to a user.

Instructions for the operating system, applications and/or programs may be located in the storage devices 26, which are in communication with the processor unit 14 through the communications bus 12. In these illustrative examples, the instructions are in a functional form on the persistent storage 18. These instructions may be loaded into the memory 16 for execution by the processor unit 14. The processes of the different embodiments may be performed by the processor unit 14 using computer implemented instructions, which may be located in a memory, such as the memory 16. These instructions are referred to as program code 38 (described below) computer usable program code, or computer readable program code that may be read and executed by a processor in the processor unit 14. The program code in the different embodiments may be embodied on different physical or tangible computer readable media, such as the memory 16 or the persistent storage 18.

The DPS 10 may further comprise an interface for a network 29. The interface may include hardware, drivers, software, and the like to allow communications over wired and wireless networks 29 and may implement any number of communication protocols, including those, for example, at various levels of the Open Systems Interconnection (OSI) seven layer model.

FIG. 1A further illustrates a computer program product 30 that may contain the program code 38. The program code 38 may be located in a functional form on the computer readable media 32 that is selectively removable and may be loaded onto or transferred to the DPS 10 for execution by the processor unit 14. The program code 38 and computer readable media 32 may form a computer program product 30 in these examples. In one example, the computer readable media 32 may be computer readable storage media 34 or computer readable signal media 36. Computer readable storage media 34 may include, for example, an optical or magnetic disk that is inserted or placed into a drive or other device that is part of the persistent storage 18 for transfer onto a storage device, such as a hard drive, that is part of the persistent storage 18. The computer readable storage media 34 also may take the form of a persistent storage, such as a hard drive, a thumb drive, or a flash memory, that is connected to the DPS 10. In some instances, the computer readable storage media 34 may not be removable from the DPS 10.

Alternatively, the program code 38 may be transferred to the DPS 10 using the computer readable signal media 36. The computer readable signal media 36 may be, for example, a propagated data signal containing the program code 38. For example, the computer readable signal media 36 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 38 may be downloaded over a network to the persistent storage 18 from another device or DPS through the computer readable signal media 36 for use within the DPS 10. For instance, program code stored in a computer readable storage medium in a server DPS may be downloaded over a network from the server to the DPS 10. The DPS providing the program code 38 may be a server computer, a client computer, or some other device capable of storing and transmitting the program code 38.

The different components illustrated for the DPS 10 are not meant to provide architectural limitations to the manner in which different embodiments may be implemented. The different illustrative embodiments may be implemented in a DPS including components in addition to or in place of those illustrated for the DPS 10.

Cloud Computing in General

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1B:
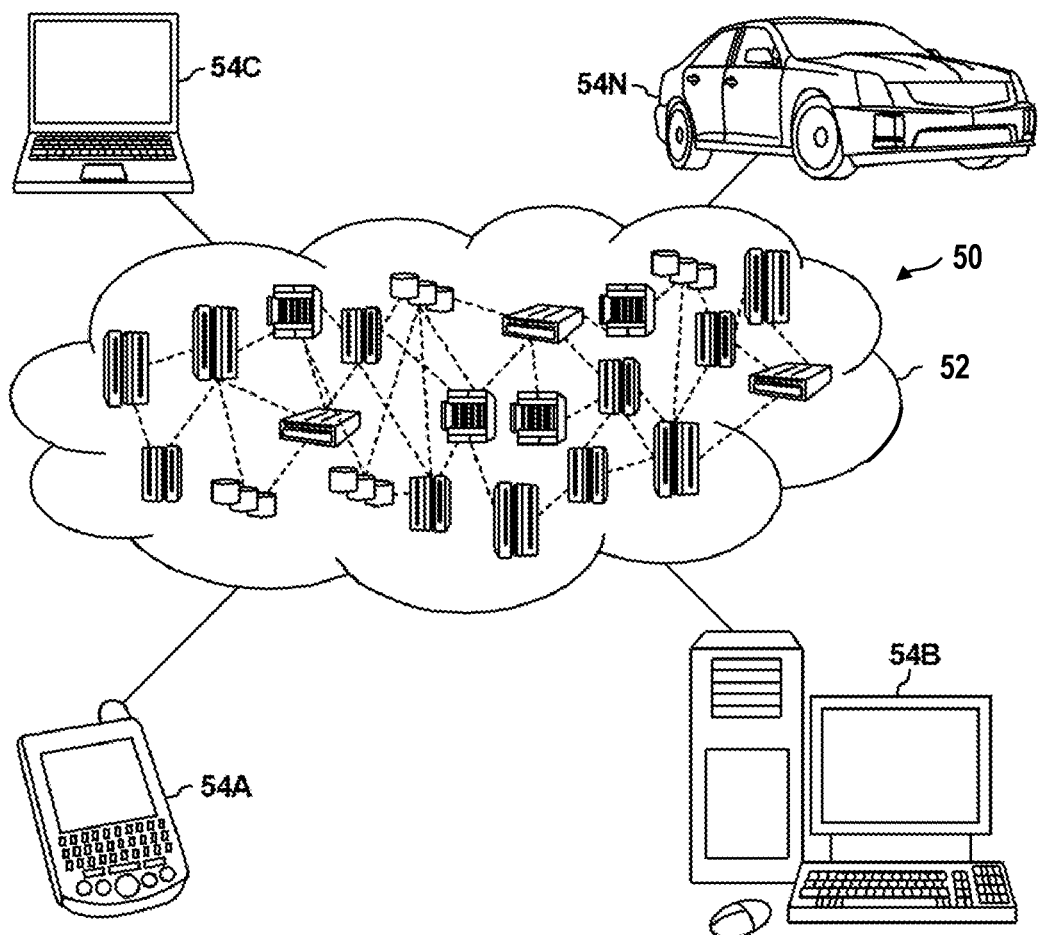
FIG. 1B is a pictorial diagram that depicts a cloud computing environment according to an embodiment disclosed herein.

Referring now to FIG. 1B, illustrative cloud computing environment 52 is depicted. As shown, cloud computing environment 52 includes one or more cloud computing nodes 50 with which local computing devices used by cloud consumers, such as, for example, personal digital assistant (PDA) or cellular telephone 54A, desktop computer 54B, laptop computer 54C, and/or automobile computer system 54N may communicate. Nodes 50 may communicate with one another. They may be grouped (not shown) physically or virtually, in one or more networks, such as Private, Community, Public, or Hybrid clouds as described hereinabove, or a combination thereof. This allows cloud computing environment 52 to offer infrastructure, platforms and/or software as services for which a cloud consumer does not need to maintain resources on a local computing device. It is understood that the types of computing devices 54A-N shown in FIG. 1B are intended to be illustrative only and that computing nodes 50 and cloud computing environment 52 can communicate with any type of computerized device over any type of network and/or network addressable connection (e.g., using a web browser).

Figure 1C:
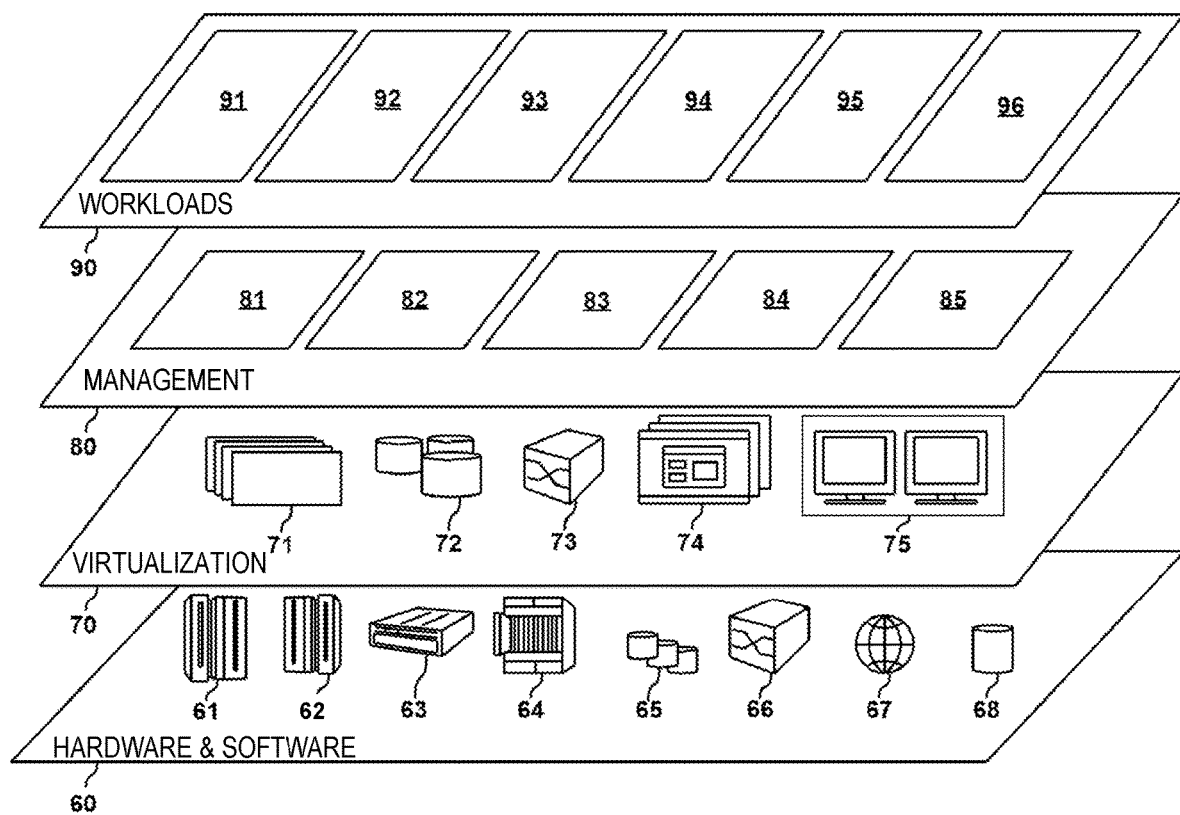
FIG. 1C is a pictorial diagram that depicts abstraction model layers according to an embodiment disclosed herein.

Referring now to FIG. 1C, a set of functional abstraction layers provided by cloud computing environment 52 (FIG. 1B) is shown. It should be understood in advance that the components, layers, and functions shown in FIG. 1C are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Any of the nodes 50 in the computing environment 52 as well as the computing devices 54A-N may be a DPS 10.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

Privacy Negotiations in a Mixed Reality Environment

Providers of an MR environment may desire to have a maximum amount of information about users, which permits the provider to optimally maximize the user's MR feed. The MR providers may obtain their financial support via MRD in the form of advertising data, and hence, their incentive is to receive as much information about users as possible. Although advertising data is a prominent type of MRD, the invention is not so limited, and MRD may encompass any type, form, and/or content of data sent to users, including advertisement (Ad) data. But the users have an interest in preserving their privacy as much as possible—hence, user privacy needs to be checked in an environment where a plethora of user-sensitive information is readily available for personalization of MRD. Furthermore, user information, once extracted, can be used in malicious ways by third-parties. By way of example, Advertisements (Ads) which are personalized, are more likely to attract the attention of users. Application Developers often earn revenue through attracting user attention to Advertisements. In a Mixed Reality Environment, the Application Developers will inevitably have access to multifarious, context and user-sensitive information to create immersive user-experiences. Since users have varying levels of privacy concerns, a balance needs to be achieved in what is shared with the MRD companies. Some users may be willing to trade-off privacy for certain incentives, which may be granted by the MRD companies.

In case of mobile device usage and web usage for apps, the permission set granted by users to applications has historically been static, standard, finite, and coarse in granularity. The amount of user-sensitive information available is increasing exponentially. In addition, the MRD, such as Ads, occupy both physical and digital space in an MR environment. Often, users are not consulted by the Applications before forwarding users' data to MR providers or their partners, such as advertisement companies. The use of MR data in the Mixed Reality space will likely bring about a monumental difference in how users interact with their environment. Augmented reality (AR), is a subset of the MR space. However, AR/MR privacy leaks can lead to real-world threats.

According to some embodiments discussed herein, negotiation BOTs at the interface level of user, application, and the MRD company dynamically converses to establish a mutually acceptable privacy policy. A BOT is a software application that is programmed to do certain tasks. A BOT is automated, meaning it runs according to its instructions without a user needing to start it up.

The methodology facilitates negotiation of "user-incentives", in that an MR provider, such as an advertisement company, may offer such incentives in exchange for access to some user-information. Since the user-view, tolerance, privacy-preferences, and possible incentives are dynamically changing, a simple and static rule-based agreement is sub-optimal. Adaptive tree-structures may, in some embodiments, be used to model the permission and personalization scores.

A privacy leak score tree (also referred to herein as a privacy tree) may be provided at the App BOT, and a personalization gain score tree (also referred to herein as a personalization tree) may be provided at the MRD BOT (an Ad BOT being one type of an MRD BOT, and an Ad agent being one type of MRD agent). These BOTS may negotiate for an agreement at runtime based on: 1) defined objective functions, 2) personalization gain score, 3) privacy leak score, 4) incentives offered, 5) data context, and/or 6) user preferences, and arrive at a consensus. The consensus is provided to the user, and if the user accepts it, then the App interface via a software development kit (SDK) and/or application program interface (API) will start sharing these consensus agreed data to the MRD interface via the SDK and/or API for personalization and incentives. The MRD BOT is a part of the SDK for enabling negotiations with the App to ensure the right data is communicated, and the SDK may contain code snippets to render the MRD to the device and decide on its time and location.

Since the user's scene (view that the user has at a particular point in time), user preferences, and MR data demands may be dynamically changing, a static rule based agreement for sharing of user data is not a scalable solution. A dynamic fine-grain negotiation may advantageously be carried out to ensure that user privacy is kept in check, while giving the MR provider the ability to personalize the MRD feed provided to the user.

The user information may permit the MRD provider to utilize the user information in ways that benefit the provider, but may be detrimental to the user. Such information may include advertising information that the user did not want to be shared. Many devices, such as smart phones/devices, that are carried by users contain sensors, cameras, microphones, location detectors, and the like, along with vast quantities of digital information related to the user. A dishonest MR provider could, with unfettered access to such a user's device, obtain significant amounts of information that the user wishes to be kept private.

To prevent this from happening, users are normally given, for an app on their smart device, control over what information is provided to the MR provider. Typically, the user wants to provide as little information to the MR provider as possible while still having a positive MR experience. However, there are few bright lines in this determination, and the user will find themselves in a position of trading off one (giving up some of their information) for the other (receiving an enhanced MR experience).

Disclosed herein is a system and method that provides negotiator bots that include the MRD BOT and the App BOT. The MRD BOT and App BOT negotiate to minimize user privacy leak while maximizing MRD personalization. In some implementations, the context of the user and relevant data may be taken into consideration. By way of example, some user information may include audio information containing the user's voice or audio in the vicinity of the user, and video/image information associated with the user, such as what the user is looking at. The degree of sensitivity of this user information may be context dependent. For example, the user's visual feed while the user is watching another individual in their home may be considered very private data, and a huge threat if such data were obtained and used by the MR provider. The same may not be (as) true, however, if the user is watching television or when other individuals are absent from the area. Thus, the severity or degree of a privacy leak of MR primary data sources (visual, voice, eye-gaze, etc.) may significantly depend on the context of the data and also may be based on the user preferences. A particular threat level perceived by User A in a particular context may be substantially different than the threat level perceived by User B in a similar context.

The negotiator bots (MRD BOT and App BOT) negotiate among themselves so that user privacy leak is minimized while maximizing MRD personalization. Negotiations may take place in a negotiation phase. Once negotiations are complete, meaning agreement has been reached, or an offer/counter offer has been accepted, the BOTs may transition into an MRD transmission phase in which the MRD BOT personalizes data sent to the App BOT to be forwarded on to the user, using the personalized information granted by the user. Although presented as separate phases, both phases may be occurring simultaneously.

The MRD BOT may start by requesting user data from the App BOT in the form of a data access request offer, which, if fully or substantially granted, could lead to maximum personalization for the user. In some instances, the MRD BOT may also offer a set of offered incentives for the App/User to share the data. The App BOT may calculate the privacy leak based on the data-context, user preference, and the proposed incentives, and come up with a decision to agree to the MRD BOT's request or to propose a new negotiation offer. This process may happen continuously between the MRD BOT and the App BOT until a consensus is achieved. Some of the possible objective functions of the BOTs are defined below.

One objective function of the MRD BOT is to increase the personalization for the user by getting more data about the user. But, at the same time, the MRD BOT has directives to not overspend on the incentives (i.e., to bring balance to the value of the incentives given vs. the value of the data received by the MRD BOT). On the other hand, another objective function of the App BOT is to minimize the privacy leak and at the same time gain incentives by sharing the data which is not critical based on the data context and user preference. However, these shared data could be leveraged by the MRD BOT for better personalization.

To achieve this balance, the system may utilize the notion of a privacy leak score tree at the App BOT, and a personalization gain score tree at MRD BOT. These BOTS then negotiate at runtime based on, e.g., their: 1) defined objective functions, 2) permission gain score, 3) privacy leak score, 4) incentives offered, 5) data context, and/or 6) user preferences (or some combination thereof). Based on these, the BOTs arrive at a consensus. The consensus may be subsequently approved by the user, and, if the user accepts it, then the App SDK will start sharing these consensus-agreed-to data to the MRD SDK for personalization and incentives. User acceptance may be determined by inquiring to the user on the display of the user device whether the user accepts or not. The user may confirm acceptance, or may reject a consensus or offer. If the user rejects an offer, the privacy tree and/or privacy subtree may be updated by, e.g., increasing a privacy score value for one or more nodes in the table.

This approach may allow effective MRD personalization in an MR space which is not possible currently due to privacy threat leaks. The system described herein may provide a novel negotiation concept between the App and the MRD SDK where the App could selectively share some data which is not leaking impermissible user privacy, but at the same time could lead to better MR personalization and better incentives to the user. Through a runtime negotiation conversation between the MRD SDK and the App SDK, where dynamic factors are used to decide on the best negotiation policy, a better approach to user privacy may be achieved. This approach may also utilize a personalized MRD push in the MR space while minimizing the user privacy concerns.

In the mobile and web world, every app has set of access permissions granted by the user while installing the application. Any MRD SDK integrated with the application can use this information and personalize the MR data delivery system (leading potentially to more user interaction with the displayed MR data, such as Ad clicks, permitting the user to have a better experience). However, in the MR world, three primary input sources to the MR apps include voice, visual, and eye feeds of the users. These three information elements may contain highly sensitive data which the user will, in general, not agree to share with third party MRD SDKs. So, MR models do not generally share these data to the MRD SDKs coupled with the App. Strict policies are likely to be enforced for the user's privacy safety.

From the MRD rendering point of view, there are two opposite scenarios now: a) completely blocking the MRD SDKs to leverage MR voice, visual, and eye feeds (used by the Apps to which MRD SDKs are coupled with) could lead to no privacy leak, but no personalization; and b) completely allowing the MRD SDKs to leverage all MR voice, visual, and eye feeds (used by the Apps to which MRD SDKs are coupled with) could lead HIGHEST privacy leak and HIGHEST level of personalization. Both of these scenarios are extreme and not preferred.

Some aspects of the novel negotiator bots (MRD BOT and App BOT) may include the following. The privacy of a leak of voice, visual, and eye feeds depends on the context of the data. For example, leaking a user's visual feeds while watching another user in the same home is a huge threat. However, leaking a visual feed when no other user is in the picture is relatively less of a threat. Leaking eye gaze data of user when they are viewing some sensitive object in home is a big threat. However, leaking an eye gaze feed when user is watching a less sensitive object (e.g., TV watching) is less of a threat.

The degree of a privacy leak of MR primary data sources (visual, voice, and eye-gaze) depends on the context of the data, and also may be based on user preferences. The context which User A feels less threat could be of high threat to another User B.

The negotiator BOTs (MRD BOT and App BOT) described herein negotiate with each other so that a user privacy leak is minimized while maximizing MRD personalization. The MRD BOT starts by presenting an offer for requesting the user data from the App BOT which could lead to maximum personalization. It may also offer incentives for the App/User to share the user data. The App BOT calculates the privacy leak based on the data-context, user preference, and the proposed incentives, and then comes up with either a decision to agree with the MRD BOT's offer or a decision to propose a new negotiation offer. This process may happen continuously between MRD BOT and App BOT until a consensus is achieved where the objective functions of the BOTs are defined below, or until some criteria is reached indicating that a consensus is not possible.

An objective function of the MRD BOT is to increase the personalization by getting more data, but at the same time it does not want to overspend on the incentives (i.e., brings balance to the value of the incentives given vs. value of the data received). On the other hand, another objective function of the App BOT is to minimize the privacy leak and at the same time gain incentives by sharing the data which is not critical based on the data context and user preference. However, the shared data could be leveraged by the MRD SDK for better personalization Using this negotiation concept between the App and MRD SDK, the App could selectively share some data which is not leaking (important) user privacy, but at the same time, could lead to better MRD personalization and better incentives for the user. A runtime negotiation conversation between MRD SDK and App SDK where dynamic factors are considered to decide on the best negotiation policy may result in an optimized solution for both the MR provider and the user.

In some embodiments, the system and method for balancing MRD- or advertisement-personalization and privacy compromise through negotiations in an MR environment, where some user data may be shared with advertisement companies, when favorably incentivized, may involve the following steps.

Figure 2:
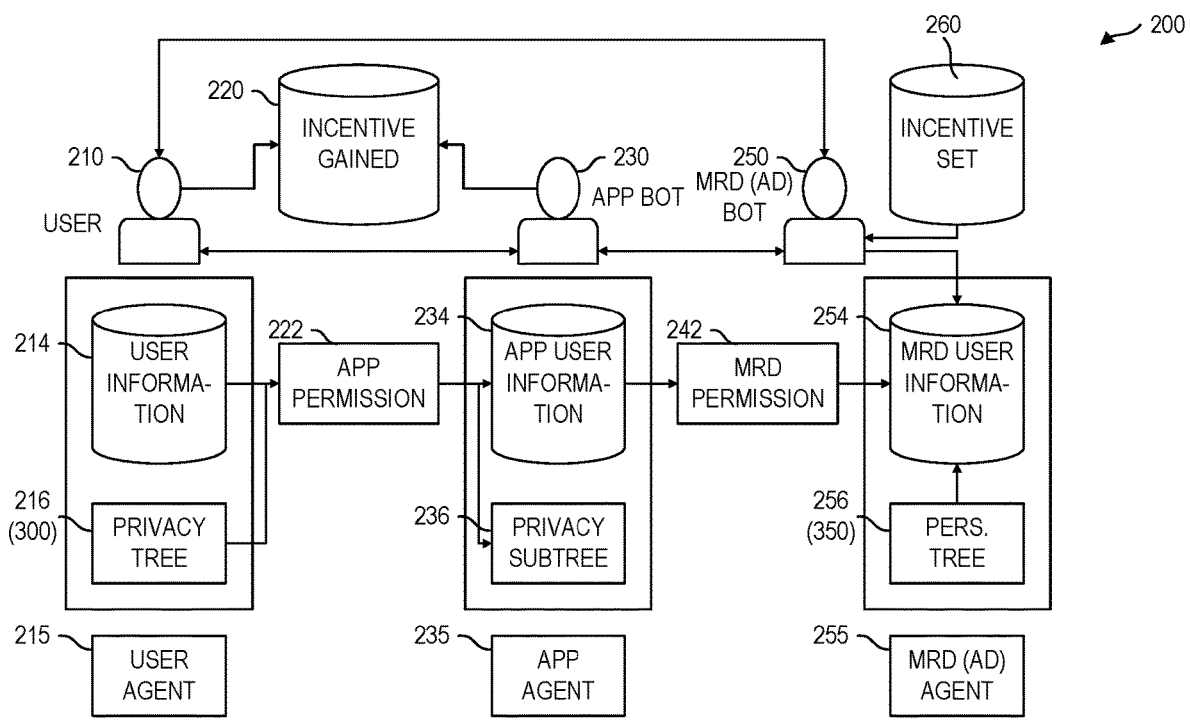
FIG. 2 is a block diagram illustrating the components and information flows for the MR system, according to some embodiments.

FIG. 2 is a block diagram illustrating the components and information flows for the MR system 200. There are three primary entities in the MR system 200: the user 210 and the user agent 215 running on a user device; the application or App BOT 230 and the app agent 235 which may run on the app device (which may be the user device); and the Ad Bot 250 (alternately, MRD BOT) and the Ad-Agent 255 (alternately MRD-Agent 255) with ad device 255. The user device, app device, and ad device may be implemented as a DPS 10, and the MR system 200 as a whole may be operated in a cloud computing environment 52 in which the DPSs 10 form nodes 50. For the sake of simplicity, the user device and the app device are referenced herein as one and the same device. However, this is not necessarily the case, and these may operate on separate devices. For example, the user device may be the user's smart phone, whereas the app device may be the user's desktop computer that is in communication with the user device.

In operation, first, an MR scene may be scanned, e.g., by the user device to determine a present set of user information entities or other user information. This may be done, e.g., every time there is a significant change in the MR environment, at a periodic time interval, or according to some other scan trigger. The information required by the app agent 235 (based on its granted application permissions 222) are sent to the app agent 235. The app agent 235 may be leveraging one or more MRD-Agents 255 for monetary gains. When an MR data element, such as an advertisement, is to be introduced to the user 210, the MRD-Agent 255 may demand user- or context-specific information to personalize the MRD. The demanded information may or may not have a standard corresponding set of user data permissions.

The user 210 may not prefer to share all the demanded information or one or more sets of user data permissions with the MRD-Agent 255 because of privacy concerns. However, the MRD-Agent 255 may be willing to give some incentives in exchange for the desired user information 214. To negotiate on the specific user-information 214 to be shared with the MRD-Agent 255, the MRD BOT 250 and App BOT 230 start a negotiation. The MRD BOT 250 has a Personalization tree 350 (FIG. 3B), which represents the personalization benefit gained 220 from various permissions. One aim of the MRD-Agent 255 is to try to have a maximum MRD Personalization at a minimum possible cost incurred from the incentive offered. The MRD BOT 250 advantageously should be able to translate the monetary gains of having a permission for a specific user 210, at a particular instant of time, and in a particular context. This is beneficial for the MRD BOT 250 to accurately compare the cost of an incentive (to be) offered from an incentive set 260 to a respective permission access gain from having a permission. The App BOT 230 has access to a Privacy Subtree 216 (300 (FIG. 3A)) of the user 210, which may comprise the privacy scores 302B assigned to various permissions 302 associated with labelled user information entities.

The App BOT 230 performs a mapping of permission(s) 302 asked for by the MRD BOT 250 into a combination of permissions 302 of the Privacy Subtree 300 or introduces additional permission nodes in the Privacy Subtree 300 when needed. The App BOT 230 may also learn the various possible permissions, their tree structure, and the general and user-specific privacy scores attributes to each of them within the Privacy Subtree 300. This Subtree 300 may be dynamically updated, based on, e.g., the context, user-behavior, responses to negotiations, permissions asked for by the MRD BOTs, 250 and reported cases of threats of privacy leaks.

The App BOT's 230 objective is to help the MRD-Agent 255 personalize the MRD with respect to the user 210 and their context—however, this is to be done with minimum privacy violation for the user 210 and maximum possible incentive gain 220 for the user 210. The App BOT 230 may carry out negotiations in a smart way, such that it is able to conceal the Privacy Subtree 300 and not make it obvious for the MRD-Agent 255 to infer the relative privacy-scores 302B. Otherwise, for the permissions 302 with a "low" corresponding score 302B, a low incentive from the incentive set 260 will be offered by the MRD-Agent 255 (even if the MRD-Agent 255 would have been ready to give a high incentive). Similar intelligence may also be incorporated in the MRD BOT 250 to ensure a fair negotiation. This is done by introducing noisy offers made by either party.

Users 210 may have varying levels of tolerance to participate in negotiation conversations with the MRD BOTs 250—hence, the App BOT 230 may determine the user-involvement based on the inferred user-tolerance levels. These again may be learned over a period of time by monitoring user 210 behavior and responses to negotiations.

The system thus helps in determining with a consensus of the User-Information to be shared with the MRD-Agent 255 (for MRD-Personalization), by resolving the dynamic fine grain requests for User-Information and dealing with Incentive offers and involving the User into the negotiations smartly based on User-Tolerance levels.

User Agent 215

With respect to the user 210, User-Information is the set of all the information a system knows about the user 210, the user's surroundings, and any time-based information related to the user 210. Each User-Information element may be labelled with a permission 302. The access to a particular permission 302 grants access to the corresponding User-Information element.

Figure 3A:
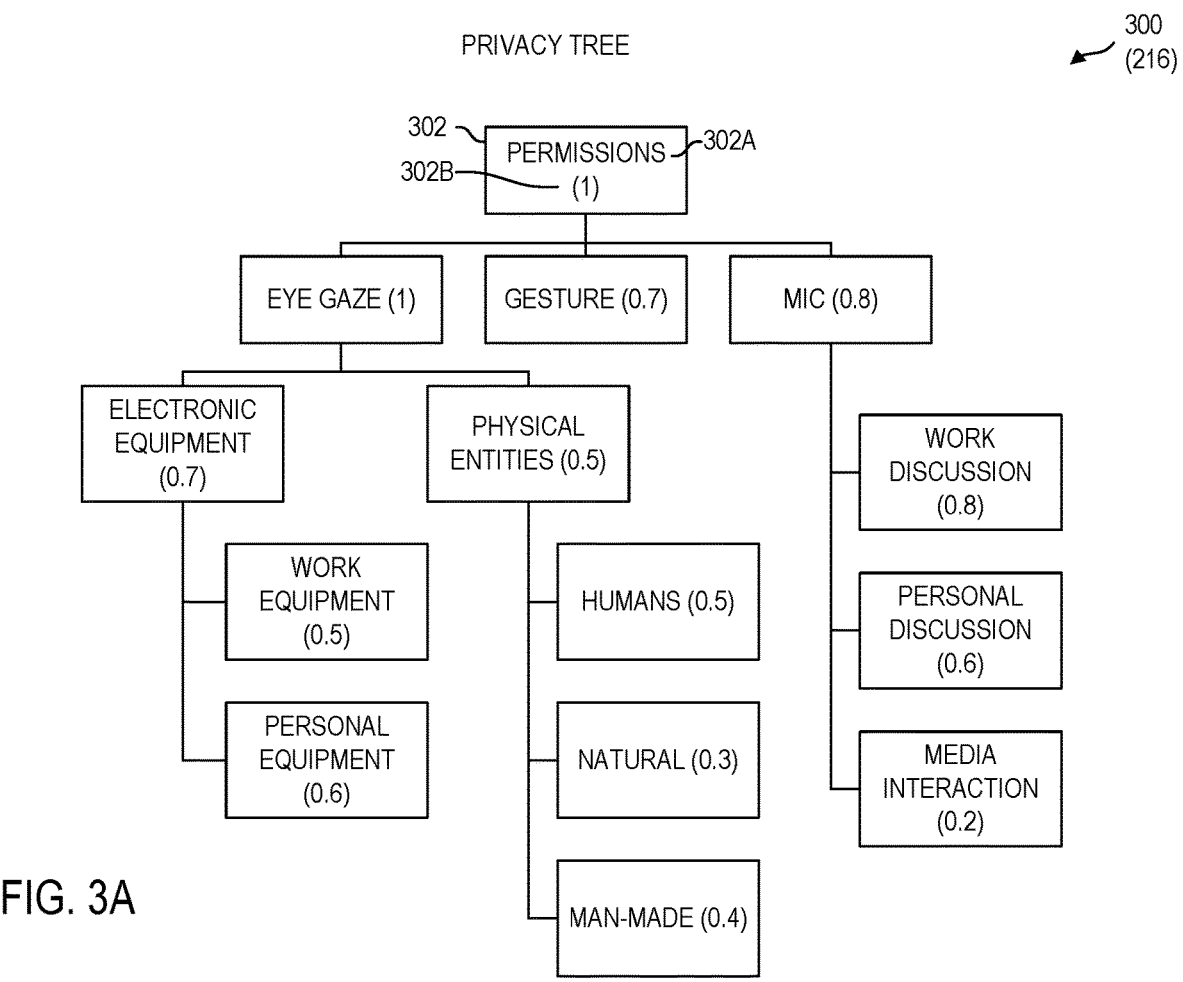
FIG. 3A is a tree diagram that illustrates a privacy tree, according to some embodiments.

FIG. 3A is a tree diagram, according to some embodiments that illustrates a privacy tree 300 (or a Privacy Subtree), which is composed of nodes representing permissions 302. Each permission 302 may have a corresponding permission label 302A and a privacy-score 302B (an estimate of the value a user 210 attributes to a particular permission 302). In some embodiments, there is an adaptive centralized privacy tree 300 for a user 210. The system may approximate and learn the permission labels 302A, privacy-scores 302B, and the tree structure by monitoring user 210 response to negotiations and user 210 behavior over time. The privacy tree 300 may be initialized with crowd-sourced data of cases filed in the past concerning exploitability of granting specific permissions. These may reflect the criticality of a privacy leak happening because of granting a set of permissions. In negotiations, a user may accept an incentive offered by the MRD-Agent 255, to increase the Incentive Gained 220 on the cost of giving up of a User-Information not earlier shared.

App Agent 235

Each application and respective app agent 235 may have a specific set of App Permissions 222. The filtered set of User-Information, received by an application, may be termed as the App User-Information 234. The nodes and edges corresponding to these permissions, when derived from the privacy tree 216, 300, are termed to be a Privacy Subtree 236. The Privacy Subtree 236 is considered by the App BOT 230 to infer the privacy scores 302B associated with each of the App User-Information 234. The scores may be used to conduct negotiations with the MRD BOT 250. As to negotiations, the App BOT 230 may carry out negotiations on the behalf of the user 210 with the Ad BOT 250 and includes user intervention based on the inferred user-tolerance levels.

MRD (Ad) Agent 255

Figure 3B:
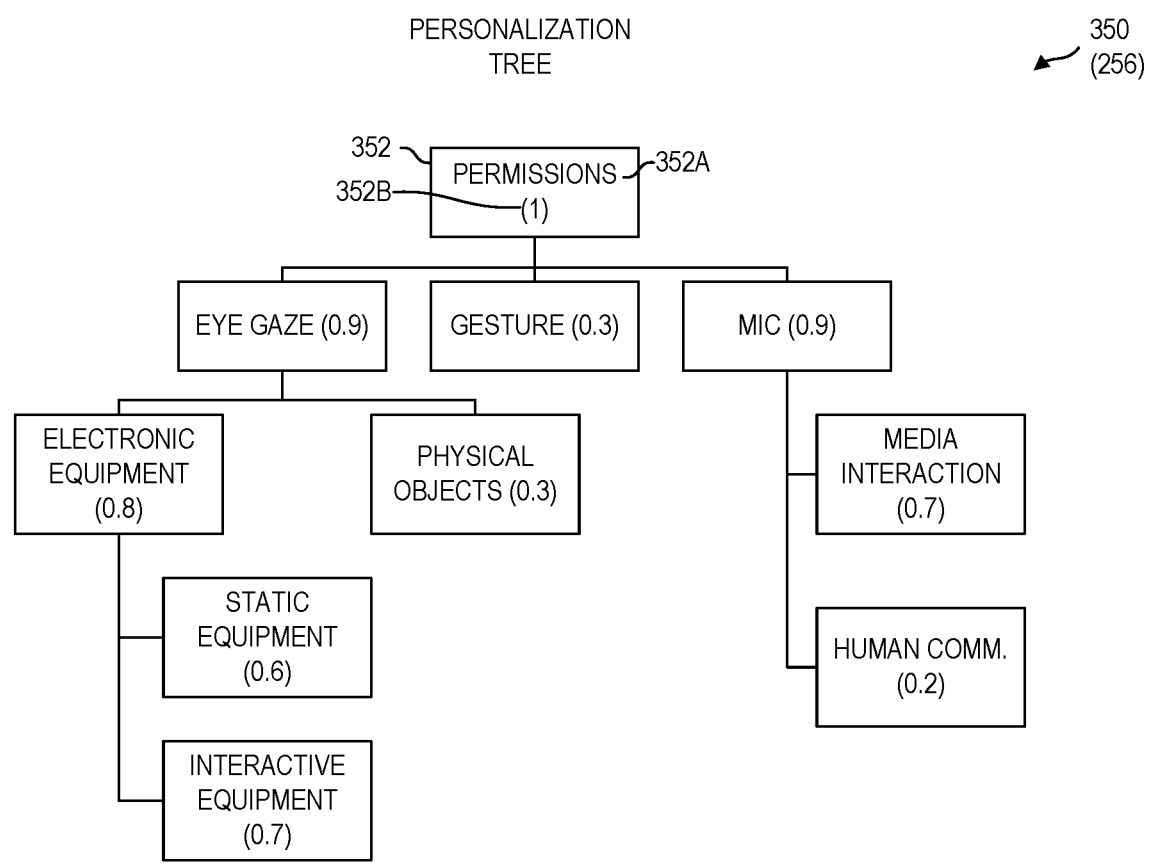
FIG. 3B is a tree diagram that illustrates a personalization tree, according to some embodiments.

For the MRD agent 255, each MRD-agent 255 may have a specific set of MRD (Ad) permissions 242. A filtered set of App user information 234, received by a particular MRD element is defined as the MRD (Ad) user information 254. In some embodiments, different MRD elements may benefit by different sets of user information. The personalization tree 350, as illustrated by way of example, according to some embodiments in FIG. 3B, represents the personalization benefit an MRD element achieves by having access to various MRD Permissions (represented by the permission nodes 352). The permission nodes 352 of the personalization tree 350 may contain a permission label 352A and an associated personalization score value 352B (where the value 352B of the permission represents and ability of being able to personalize an MRD element). The personalization tree 350 may be used by the MRD BOT 250 to conduct negotiations with the user 210 and the app BOT 230. For negotiations, the MRD BOT 250 may offer an incentive (to get an MRD element Permission) from its incentive set 260. Each incentive may cost the MRD-Agent 255 some monetary amount. If the cost of the incentive is less than the gain from personalization, then an offer may be proposed.

Figure 4:
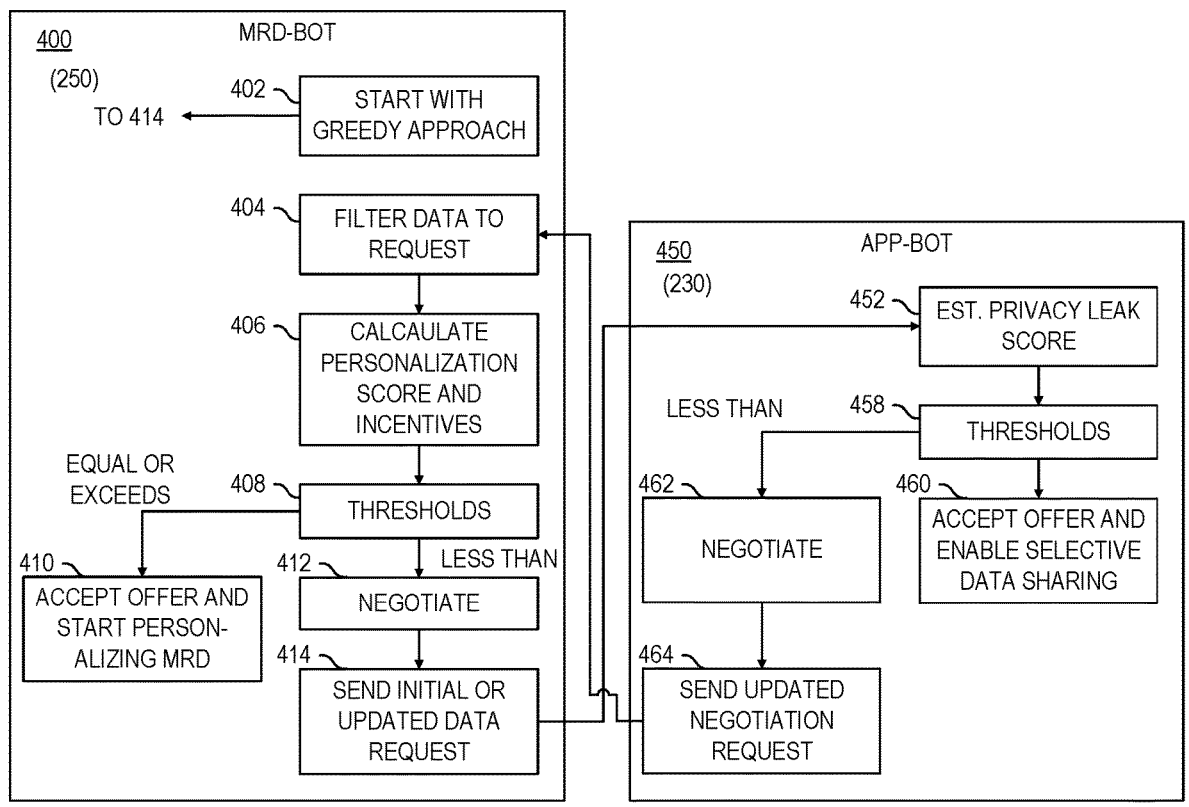
FIG. 4 is a flowchart that represents a negotiation process between the MRD BOT and the App BOT, according to some embodiments.

FIG. 4 is a flowchart that represents a negotiation process between the MRD- (Ad-) BOT 250, 400, and the App BOT 230, 450, according to some embodiments.

In some embodiments, every time there is a substantial change in the user's scene (based on the scanned context of the user) or the MRD BOT 250 wants to place or reconfigure MRD or ad information to be provided to the user, the negotiation flow may be triggered, with the following objectives for each entity (user 210, App Bot 230, and MRD BOT 250), e.g. The user's 210 objectives may include: a) maximizing the value from incentive gained 220; and b) minimizing the privacy leak through minimal sharing of high privacy user information 214. However, each user 210 has a "tolerance-level", which represents how willing a user is to participate in a negotiation conversation—this can vary for each user based on the counterpart MRD BOT 250 or other parameters. The tolerance-level may be inferred by learning user responses over time in different negotiations.

The App BOT's 230 objectives may include maximizing the incentive gained 220 for the user 210 and MRD personalization for an MRD-Agent 255, and minimizing the privacy leak through minimal sharing of high privacy App User-Information 234.

The MRD BOT's 250 objective may include maximizing the personalization of advertisements through collecting MR User-Information 254, and minimizing the cost of the incentives offered from the Incentives Set 260. Put differently, an objective function of the MRD BOT 250 is to increase the personalization of its MRD in the form of ads or other communicated information by getting more data, but at the same time without overspending on the incentives (i.e., bringing balance to the incentives given vs value of the data received). This contrasts with the objective function of the App BOT 230, which is to minimize the privacy leak and at the same time gain incentives by sharing the data which is not critical, based on the data context and user preference. However, these shared data could be leveraged by the MRD SDK for better personalization.

The negotiation BOTs (App BOT 230 and MRD BOT 250) may be provided, e.g., at the interface level of the user, application, and the MR data providing company which dynamically converses to establish a mutually acceptable privacy policy. In operation 402, the MRD BOT 400 begins with a greedy approach, that is, it attempts to obtain a maximum level of permissions and/or data from the user 210 with minimal cost of providing incentives. It sends an initial data access request offer in operation 414 that utilizes the greedy approach. In operation 404, the MRD BOT 400 filters the data that may be associated with a negotiation request that may have been sent by the App BOT 450. Based on this received required data, in operation 406, the MRD BOT 400 may calculate a personalization score and consider incentives to offer from its incentive set 260.

In operation 408, the MRD BOT 400 considers various thresholds. If the personalization score as above an acceptable level threshold, and the incentive offered is below a cost threshold, then in operation 410, the offer may be accepted with the App BOT 450 and once access to the desired information is obtained, the MRD BOT 400 may personalize the information that is sent to the user 210 using the newly acquired information.

Conversely, in operation 412, if one of the thresholds is not met, the MRD BOT 400 may negotiate with the App BOT 450 to attempt to increase the personalization score (and a value of a level of permissions or data from the user) and/or reduce the incentive costs. An overall value may take into account the personalization value and the incentive costs. The MRD BOT 400 may communicate one or both of these to the App BOT 450 by way, e.g., of a (second) counter-offer along with an updated data access request offer in operation 414.

The App BOT 450, in operation 452, receives the counter-offer from the MRD BOT 400, and, based on the counter-offer/data request, estimates a privacy leak score, which may take into account one or more of user preferences, context information, and user-provided information. An overall value score may be determined utilizing this information. In operation 458, various thresholds are checked, such as the privacy leak threshold. If the privacy leak score is below an acceptable privacy leak threshold level, and/or the incentive offered is above an acceptable threshold level, the App BOT 450, in operation 460, may accept the offer and enable selective data sharing to the Ad-BOT. Otherwise, in operation 464, the App BOT may send an updated negotiation request in the form of a counter-offer in order to reduce the privacy leak score and/or increase the incentives for providing access to data.

Use Case Example

The following use case example illustrates a negotiation between the MRD BOT and the App BOT, as might be implemented according to some embodiments disclosed herein.

TABLE 1

Use Case Example of a Conversation between an MRD BOT and an App Bot

| | | |
|---|---|---|
| MRD BOT | I want to have Eye Gaze permission. | |
| App BOT | | I can give you Eye Gaze data of Natural Objects. |
| MRD BOT | I do not want that. I want Eye Gaze permission on Electronic Equipment. | |
| App BOT | | You can have Eye Gaze data on Work Equipment permission if you have an adequate incentive offer to make. |
| MRD BOT | I will give an extended 5-day trial if I get both Eye Gaze data on Work Equipment and Personal Equipment permission | |
| App BOT | | User: would you like to accept an incentive offer of sharing all Electronic Equipment Eye Gaze data with the MR provider in return for a 5-day extended trial? |
| User | Yes! | |

Technical Application

The one or more embodiments disclosed herein accordingly provide an improvement to computer technology. For example, an improvement to a user's information security that is negotiated with an MR provider can mutually benefit both the MR provider and the user by striking a proper balance between sharing user information and providing a good MR experience for the user.

Computer Readable Media

The present invention may be a system, a method, and/or a computer readable media at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for controlling exchange of data between applications, the method comprising, on a processor of an application (App)-BOT:
   scanning a current context of a user of the application at runtime during a negotiation phase and obtaining current user-device scanned user data entities;
   determining a set of user information entities from the scanned user data entities containing current information about the user and surroundings of the user;
   labelling each user information entity of the set of user information entities with a user data permission that is used to access the user information entity;
   negotiating, in the negotiation phase, by:
   receiving a data access request offer from a mixed reality data (MRD)-BOT, the data access request offer comprising a request offer for a set of application specific permissions that are requested permissions to access a labelled user information entity;

estimating a privacy leak score that represents a user value attributed to permission to access the labelled user information entity based on the data access request offer;

responsive to automatically determining that the privacy leak score is equal to or exceeds a privacy leak score threshold:

sending an acceptance of the data access request offer to the MRD BOT and automatically providing access requested by the data access request by enabling selective data sharing to the MRD BOT; and receiving a corresponding incentive from the MRD BOT; and responsive to automatically determining that the privacy leak score is less than the privacy leak score threshold that relates, in part, to data on the surroundings of the user, sending a counteroffer to the access request offer to the MRD BOT.

2. The method of claim 1, wherein:

a privacy tree data structure comprises nodes, each of the nodes representing one of the user data permissions and each having a corresponding permission label and a corresponding privacy score; and the data access request offer further comprises a set of offered incentives offered by the MRD BOT; and the method further comprising:

creating an application-specific privacy subtree structure comprising a subset of the nodes of the privacy tree based on the privacy tree data structure and sets of application specific permissions;

determining an overall value based on a privacy score of the requested permissions in the privacy subtree structure, the set of offered incentives, as well as the current scanned user data entities, and user preferences.

3. The method of claim 2, further comprising:

responsive to determining that the overall value equals or exceeds an overall value threshold:

receiving user approval information related to a user approval of the set of application specific permissions;

responsive to determining that the overall value is less than the overall value threshold:

sending the counteroffer to the offer to the MRD BOT.

4. The method of claim 3, further comprising:

responsive to the user approval information being positive, sending the acceptance of the data access request offer to the MRD BOT and providing access requested by the data access request; and responsive to the user approval information being negative, sending the counteroffer to the offer to the MRD BOT.

5. The method of claim 4, further comprising, responsive to the user approval information being positive:

updating the privacy tree structure and the privacy subtree structure.

6. The method of claim 2, further comprising, responsive to the determining that the privacy leak score is equal to or exceeds the privacy leak score threshold:

updating the privacy tree structure and the privacy subtree structure.

7. The method of claim 6, wherein updating the privacy tree structure and the privacy subtree structure comprises:

updating a permission label and the corresponding privacy score of at least one privacy tree structure node; and updating the permission label and the corresponding privacy score of at least one privacy subtree structure node.

8. A method for controlling exchange of data between applications, the method comprising, on a processor of a mixed reality data (MRD) BOT:

inferring a user tolerance level representing a willingness of a user to participate in a negotiation by learning user responses over time in different negotiations;

negotiating, in a negotiation phase, by:

sending a data request offer to an application (App) BOT, the data request offer comprising a request for permission to access a labelled user information entity;

receiving a counteroffer in response to the data request offer;

filtering potential MRD based on data of the counteroffer;

determining a personalization score that takes into account incentive values;

responsive to automatically determining that the personalization score meets or exceeds a personalization score threshold, sending an acceptance of the counteroffer to the App BOT; and responsive to automatically determining that the personalization score is less than the personalization score threshold that relates to the incentive values, sending a second counteroffer to the App BOT.

9. The method of claim 8, further comprising:

creating a personalization tree structure comprising nodes, each of the nodes representing a personalization benefit gained from one or more user permissions.

10. The method of claim 9, further comprising:

determining an incentive cost of an incentive from an incentive set that is based on the personalization benefit for a user permission at a particular instant of time and in a particular context; and comparing the incentive cost with a permission access gain associated with the user permission; and responsive to determining the incentive cost is less than the associated permission access gain, including the incentive in at least one of the data request offer and the second counteroffer.

11. The method according to claim 8, further comprising, in an MRD transmission phase:

personalizing MRD to create personalized MRD using a user information entity received from the App BOT; and sending the personalized MRD to the App BOT.

12. The method according to claim 8, wherein the negotiating is triggered by at least one of a change in a scanned context of the user and a placing or reconfiguring of the MRD.

13. The method according to claim 8, wherein the negotiation seeks to maximize an overall value that takes into account a value of a level of permissions or data from the user, and an incentive cost.

14. A system for controlling exchange of data between applications, the system comprising:

an application (App) BOT comprising a memory and a processor, the processor being configured for:

scanning a current context of a user of the application at runtime during a negotiation phase and obtaining current user-device scanned user data entities;

determining a set of user information entities from the scanned user data entities containing current information about the user and surroundings of the user;
labelling each user information entity of the set of user information entities with a user data permission that is used to access the user information entity;
negotiating, in the negotiation phase, by:
receiving a data access request offer from a mixed reality data (MRD)-BOT, the data access request offer comprising a request offer for a set of application specific permissions that are requested permissions to access a labelled user information entity;
estimating a privacy leak score that represents a user value attributed to the permission to access the labelled user information entity based on the data access request offer;
responsive to automatically determining that the privacy leak score is equal to or exceeds a privacy leak score threshold:
sending an acceptance of the data access request offer to the MRD BOT and automatically providing access requested by the data access request by enabling selective data sharing to the MRD BOT; and
receiving a corresponding incentive from the MRD BOT; and
responsive to automatically determining that the privacy leak score is less than the privacy leak score threshold that relates, in part, to data on the surroundings of the user, sending a counteroffer to the access request offer to the MRD BOT; and
a mixed reality data (MRD) BOT comprising a memory and a processor, the processor being configured for:
negotiating, in a negotiation phase, by:
sending a data request offer to an application (App-) BOT, the data request offer comprising a request for permission to access a labelled user information entity;
receiving a counteroffer in response to the data request offer;
filtering potential MRD based on data of the counteroffer;
determining a personalization score that takes into account incentive values;
responsive to automatically determining that the personalization score meets or exceeds a personalization score threshold, sending an acceptance of the counteroffer to the App BOT; and
responsive to automatically determining that the personalization score is less than the personalization score threshold that relates to the incentive values, sending a second counteroffer to the App BOT.

15. The system of claim 14, wherein:
for the App BOT:
a privacy tree data structure comprises nodes, each of the nodes representing one of the user data permissions and each having a corresponding permission label and a corresponding privacy score; and
the data access request offer further comprises a set of offered incentives offered by the MRD BOT; and
the App BOT processor further being configured for:
creating an application-specific privacy subtree structure comprising a subset of the nodes of the privacy tree based on the privacy tree data structure and sets of application specific permissions; and
determining an overall value based on a privacy score of the requested permissions in the privacy subtree structure, the set of offered incentives and the first objective function, as well as the current scanned user data entities, and user preferences;
the MRD BOT processor further being configured for:
creating a personalization tree structure comprising nodes, each of the nodes representing a personalization benefit gained from one or more user permissions.

16. The system of claim 15, wherein:
the App BOT processor is further configured for:
responsive to determining that the overall value equals or exceeds an overall value threshold:
receiving user approval information related to a user approval of the set of application specific permissions;
responsive to determining that the overall value is less than the overall value threshold:
sending the counteroffer to the offer to the MRD BOT; and
the MRD BOT processor is further configured for:
determining an incentive cost of an incentive from an incentive set that is based on the personalization benefit for a user permission at a particular instant of time and in a particular context; and
comparing the incentive cost with a permission access gain associated with the permission; and
responsive to determining the incentive cost is less than the associated permission access gain, including the incentive in at least one of the data request offer and the second counteroffer.

17. The system of claim 16, wherein the App BOT processor is further configured for:
responsive to the user approval information being positive, sending the acceptance of the data access request offer to the MRD BOT and providing access requested by the data access request; and
responsive to the user approval information being negative, sending the counteroffer to the offer to the MRD BOT.

18. The system of claim 15, wherein the App BOT processor is further configured for, responsive to the determining that the privacy leak score is equal to or exceeds a privacy leak score threshold:
updating the privacy tree structure and the privacy subtree structure, wherein the updating comprises:
updating the permission label and the corresponding privacy score of at least one privacy tree structure node; and
updating the permission label and the corresponding privacy score of at least one privacy subtree structure node.

19. The system of claim 14, wherein the MRD BOT processor is further configured for:
personalizing MRD to create personalized MRD using a user information entity received from the App BOT; and
sending the personalized MRD to the App BOT.

20. The system of claim 14, wherein the negotiating is triggered by at least one of a change in the scanned context of the user and a placing or reconfiguring of the MRD.

* * * * *